United States Patent [19]

Quame

[11] Patent Number: 4,547,263
[45] Date of Patent: Oct. 15, 1985

[54] METHOD FOR OBTAINING USEFUL PRODUCTS FROM GREEN PSEUDOSTEM, INCLUDING PAPERMAKING PULP PLANTAIN

[76] Inventor: Babington A. Quame, 331 E. 29th St., New York, N.Y. 10016

[21] Appl. No.: 470,198

[22] Filed: Feb. 28, 1983

[51] Int. Cl.⁴ .......................... D21C 1/02; D21C 3/26; D21C 9/10; D21C 9/18
[52] U.S. Cl. ............................................ 162/14; 19/8; 71/23; 162/16; 162/26; 162/28; 162/30.1; 162/99; 162/DIG. 5
[58] Field of Search ...................... 19/7, 8; 162/19, 28, 162/96, 99, 30.1, 26, 30.11, 14, 16, 18, 56, DIG. 5; 71/23

[56] References Cited

U.S. PATENT DOCUMENTS

| | | | |
|---|---|---|---|
| 1,367,279 | 10/1919 | Pomorski | 162/99 |
| 2,186,487 | 1/1940 | Joachim | 162/96 |
| 2,362,813 | 12/1958 | Birdseye | 162/96 |
| 2,723,194 | 11/1955 | Birdseye | 162/96 |
| 3,238,088 | 3/1966 | Villavicencio et al. | 162/19 |
| 3,620,911 | 11/1971 | Eklund | 162/99 |
| 3,688,345 | 9/1972 | Villavicencio | 19/7 |
| 3,694,308 | 9/1972 | Butz | 162/96 |

FOREIGN PATENT DOCUMENTS

553129  2/1958  Canada .................. 162/28

*Primary Examiner*—Steve Alvo
*Attorney, Agent, or Firm*—Steinberg & Raskin

[57] ABSTRACT

A method and apparatus for continuously producing pulp from previously unusable agricultural fibers, such as plantain. The pulp is used in papermaking. The pulp effluent is recycled and concentrated during the process, thereby enabling economical recovery of chemical by-products for use as fertilizer or animal feed material.

4 Claims, 4 Drawing Figures

METHOD FOR OBTAINING USEFUL PRODUCTS FROM GREEN PSEUDOSTEM, INCLUDING PAPERMAKING PULP PLANTAIN

BACKGROUND OF THE INVENTION

This invention relates to a method for continuously producing a pulp from agricultural fibers to be used ultimately in the papermaking industry. The invention also relates to a manufacturing system for accomplishing this purpose.

Paper is formed from fibers derived primarily from wood, and can also be made from cotton, straw, flax, and other vegetable fibers. The paper is formed from matted or felted fibrous sheets formed on a fine wire screen from a liquid suspension pulp. The isolation and preparation of fibers in an acceptable form for papermaking generally involves the processes of pulping, bleaching, and refining.

The pulping process depends for its success upon the differences in the chemical and physical properties between the fibers themselves and the regions responsible for fiber bonding. The pulping process involves the separation of the fibrous elements from each other by means of mechanical or chemical action.

The raw fibers produced during pulping are often given a bleaching or brightening treatment to remove or convert colored material to a colorless form. The exact nature of the chemical reactions which occur during bleaching are not too well understood because of the complex nature of the bleaching agents, and the chromophores, that is, the chemical groups which give rise to color in molecules.

Bleaching reactions are also complicated by the fact that large volumes of water are necessary, and which become contaminated. The recovery and conversion of the water is difficult and expensive. Therefore, reuse of the water for other purposes in papermaking is discouraged. Considerable research has been devoted to high consistency bleaching to minimize water usage, and the use of less polluting chemicals.

The last step before papermaking involves "beating and refining," often called stock preparation. The purpose of this step is to produce a greater degree of bonding and strength in the finished sheet. Chemicals and other additive materials are often added in this stage of the process, and the pulp then becomes ready for conversion into paper.

Declining stocks of wood have substantially increased the cost of papermaking in recent years. Moreover, the large amounts of water used in the pulping process which become polluted have led to efforts to minimize water usage, or to recycle it for other purposes.

SUMMARY OF THE INVENTION

It is an object of the present invention to provide a new source of material and method for producing pulp from plantain. Another object of this invention is to provide a manufacturing system for conversion of the plantain into a pulp suitable for papermaking.

A further object of this invention is to reuse the aqueous effluent from the pulping process.

In accordance with the present invention, a method and apparatus have been developed which serve to extract alpha-cellulose from leaves and fibers of plantain. The invention also contemplates conversion of the effluent from the pulp into a highly concentrated or dried sludge which can be used as a soil conditioner or fertilizer.

BRIEF DESCRIPTION OF THE DRAWINGS

A more complete appreciation of the present invention and many of the attendant advantages thereof will be readily understood by reference to the following description of the preferred embodiments, when considered in connection with the accompanying drawings wherein.

DESCRIPTION OF THE PREFERRED EMBODIMENTS

Prior art efforts to convert the plantain or banana pseudostems into Kraft and soda pulp have been unsuccessful. Thus, a potential resource of several million tons of pseudostems from plantain cultivation has not been commercially exploited.

This fibrous plant can be used economically for the production of inexpensive paper and paper products in any country where plantain is grown. However, in order to extract fibers from plantain for the manufacture of pulp and paper, foreign matter, such as starch, parenchyma pith cells, as well as water soluble substances in the liquid wastes must be removed from the pseudostem before it can be used for pulp and papermaking.

The parenchyma pith cell is a component of the soft cellular material occupying the center of the pseudostem of the plantain. The physical and chemical properties of various varieties of plantain have been investigated. A tabulation of these properties for five different varieties appears in Tables I and II.

TABLE I

|     |                             | 1    | 2       | 3 | 4 (Depithed Fiber) | 5 (Depithed Fiber) |
| --- | --------------------------- | ---- | ------- | - | ------------------ | ------------------ |
| (a) | Initial pH of effluent      |      |         |   | 5.6                | 7.21               |
| (b) | Cold water solubility       |      |         |   | 20.85              | 17.24              |
| (c) | Hot water solubility        |      | 27.7    |   | 29.31              | 23.09              |
| (d) | Moisture content of stem    | 5.96 |         |   | 12.0               | 15.98              |
| (e) | Alcohol-benzene solubility  |      | 5.40    |   | 5.63               | 5.56               |
| (f) | Ether solubility            |      | 1.60    |   | 1.50               |                    |
| (g) | One percent NaOH solubility |      | 47.8    |   | 48.50              | 46.85              |
| (h) | Average fiber length        |      | 2.52 mm |   | 3.235 mm           | 3.87 mm            |
| (i) | Average width               |      | 0.294 mm |  | 27.2μ              | 26.90μ             |
| (j) | Pentosan content            |      | 15.90   |   | 15.50              |                    |
| (k) | Lignin content              | 16.9 | 18.10   |   | 14.75              | 13.67              |

TABLE I-continued

|     |                              | 1     | 2     | 3     | 4 (Depithed Fiber) | 5 (Depithed Fiber) |
|-----|------------------------------|-------|-------|-------|--------------------|--------------------|
| (l) | Nitrogen content average     | 0.25  |       |       | 0.284              |                    |
| (m) | Furfur content               | 6.61  |       |       | 6.38               |                    |
| (n) | Holocellulose content (Average) | 48.00 | 46.70 | 48.20 | 62.50              | 63.63              |
| (o) | Ash Content (Average)        | 3.5   | 8.90  |       | 9.20               | 9.15               |
| (p) | Sand                         |       |       |       | 0–3.25             | 6.8                |

TABLE II

|     | Pulp Measurement and Properties | 1 Bleached pulp | 2 Unbleached pulp | 3 Unbleached pulp | 4 (Depithed Stem) Bleached pulp | 5 (Depithed Stem) Bleached pulp |
|-----|---------------------------------|-----------------|-------------------|-------------------|---------------------------------|---------------------------------|
| (a) | Average pulp yield              | 48.00           | 50.0              | 48.00             | 62.50                           | 63.5                            |
| (b) | Average fiber length in mm      |                 | 2.52 mm           |                   | 3.235 mm                        | 3.87 mm                         |
| (c) | Average fiber width in μm       |                 | 0.294 mm          |                   | 27.2μ                           | 26.9μ                           |
| (d) | Average lumen width in μm       |                 |                   |                   |                                 | 16.2μ                           |
| (e) | Average cell wall thickness     |                 |                   |                   |                                 | 10.6 μ                          |
| (f) | Freeness of pulp (csf/ml)       |                 |                   |                   |                                 | 203                             |
| (g) | Tensile                         |                 |                   |                   |                                 |                                 |
|     | i. Stretch (Goodbrand)          |                 | 5.00              |                   |                                 |                                 |
|     | ii. lbs/sq in                   |                 |                   | 9.5               |                                 |                                 |
|     | iii. Breaking length (Goodbrand) |                | 9,010             |                   |                                 | 10.8 km                         |
|     | (Schepper) M                    |                 |                   | 39.64 m           |                                 |                                 |
| (h) | Apparent density gm/cc          |                 |                   |                   |                                 | 0.71                            |
| (i) | Tear (factor unit 300 csf)      |                 |                   |                   |                                 | 119                             |
|     | i. Resistance in gms            |                 |                   | 72                |                                 |                                 |
|     | ii. Factor Marx Elemendorff     |                 | 85                | 105               |                                 |                                 |
| (j) | Air Porosity (drainage in seconds) |              | 360               | 42.5              |                                 |                                 |
| (k) | Burst (factor units 300 cfs)    |                 | 90                |                   |                                 | 72                              |
|     | i. lbs/sq in (average)          |                 |                   | 24.2              |                                 |                                 |
|     | ii. Mullen                      |                 | 64.10             | 24.69             |                                 |                                 |
| (l) | Folding endurance double fold   |                 |                   |                   |                                 |                                 |
|     | i. (Schepper in meters)         |                 | 2,900             |                   |                                 |                                 |
| (m) | Ring stiffness                  |                 |                   | 2.52              |                                 |                                 |
| (n) | Whiteness                       | 95.5            |                   |                   | 79.8                            | 80                              |
|     | i. Photovolt                    |                 |                   |                   |                                 |                                 |
| (o) | Ash content                     | 1.0             |                   |                   |                                 |                                 |
| (p) | Copper number                   | 0.9             |                   |                   |                                 |                                 |
| (q) | Cuprammonium                    | 21.4            |                   |                   |                                 |                                 |
| (r) | Lignin content                  | 1.5             |                   |                   |                                 |                                 |
| (s) | Furfur content                  | 3.4             |                   |                   |                                 |                                 |

It has been estimated that by pulping one ton of the plantain pseudostem, 5,000 gallons of effluent would have to be discarded. The present invention can conveniently convert 10 to 12 tons of plantain psuedostems to pulp on an hourly basis. With a plant operating 24 hours a day, this would amount to 1,440,000 gallons of effluent.

The composition of the effluent from the plantain pseudostems includes traces of water soluble free amino acids, nitrogen, phosphorus, potassium, sodium, calcium, magnesium, and other substances necessary for plant growth.

Thus, the plantain effluent can serve as a basic commercial source of raw material for the production of fertilizers or animal feeds.

In accordance with the present invention, it has been determined that 5% of water soluble organic compounds as total protein of the free amino acids can be recovered from the plantain pseudostems. Based upon the isolation and purification of the free amino acids, it has been found that repeated reuse of the effluent for pulping several tons of plantain, would substantially increase the concentration of the free amino acids for recovery. A dried sludge or high concentration of the effluent can then be used as a soil conditioner, or fertilizer.

An extraction device has been developed to concentrate solid material from the effluent used in extracting alpha-cellulose from the plantain pseudostems. This extraction device is capable of providing a highly concentrated effluent so that amino acids can be recovered and used in the manufacture of fertilizers or animal feeds.

The extraction device of the present invention can use acid, alkali, bleach and other chemical reagents to digest, beat, depith the fiber, wash, clarify and bleach an alpha-cellulose from the plantain-banana pseudostems for papermaking.

In further accordance with the present invention, it has been found that the bulky plantain fibers favor mild conditions for digestion. Thus, the digestion can be accomplished in a backup conveyor pressure cooker for continuous cooking of the bulky fibers. The backup conveyor pressure cooker can also be easily adapted for agricultural fibers other than plantain, including bamboo, cassava stalk, coconut husk, corn stalk and corn husk, hibiscusplant and shrubs, rice straw, sugar cane bagasse, esparto (several species of grass), and the like.

The cooking mechanism can maintain a constant high temperature necessary to dissolve lignin and other solid materials that are associated with the alpha-cellulose of most agricultural fibers, in a shorter period of time.

The construction of the apparatus or device necessary to carry out the present invention is relatively simple and inexpensive to build and operate.

Referring now to FIGS. 1 to 4, wherein like reference characters depict identical or corresponding pieces of apparatus, green plantain pseudostems are cut into small pieces on the order of ½" in length, or torn into shreds at plantation 1. The pieces of plantain are then placed on conveyor 2 which feeds them through roller press 3. The set of rollers in roller press 3 compress the pieces of pseudostems to produce a fluid which flows through pipe 28 into storage tank 26 equipped with a metering pump 27 and a vent 104.

The defluidized pieces of plantain pseudostems then proceed to a pre-soaking and drag cooking vessel 4, which is equipped with an endless conveyor belt 5 which revolves on rollers 8, and is also equipped with plates 7.

The plates 7 have openings to allow for liquid drain-off as the conveyor belt rises above any liquid level that is present, which can be drained through valve 6.

The cooked or soaked material then enters defibrating vessel 10 through chute 9, where vigorous beating of the fiber occurs, to remove as much foreign matter as possible.

The defibrator 10 includes cutters 11 which counter-rotate at different speeds to handle and grind material placed therein. Proper beating of the fiber by the defibrator can reduce the amount of chemical reagents subsequently used in the alkaline cook and bleaching stages.

The defibrator 10 has a motor 12 and a solid state controller (not shown), to prevent motor and pump failure. A valve 13 drains the defibrator 10 into pipe 25 connected to storage tank 26.

The action of the shearing or cutting mechanism 11 in the defibrator converts the pseudostem material into a fine slurry which flows continuously onto filtering conveyor 14, which is composed of an endless stainless steel sieve equipped with rollers 15, which squeeze the liquid from the slurry produced in defibrator 10. Filtering conveyor 14 is positioned on top of storage tank 16 which collects the liquid passing through the sieve of the conveyor.

A pump 20 is connected to storage tank 16 by means of pipe 17, and is also connected to presoaking and drag cooking vessel 4 and chute 9 by means of tee 22 and pipes 24 and 23, respectively. The configuration of pump 20 will thus enable recycling the aqueous solution from storage tank 16 until the concentration of solids in the solution increase. The concentrated mixture can then be drawn off from storage tank 16 through valve 18 or through line 25 connecting with storage tank 26, and controlled by valve 19.

The concentrated mixture in tank 26 contains components which can be used as plant food or fertilizer, and also includes starch and several organic and inorganic salts, for which recovery can also be made. Residual organic matter can then be burned as fuel, where needed.

The fibrous material left on filtering conveyor 14 is supplied to storage bin 29. The top of storage bin 29 is equipped with means such as a mechanical cam device 30 which forces the contents of storage bin 29 into a large opening 36.

The cam device 30 is suitably connected to a geared motor 31 which is provided with a seat 32, a cam spring 33, and a projecting pistle 34. An air input 35 is also provided at the top of storage bin 29 to accelerate the discharge of the mass into opening 36 towards a depithing vessel 37.

As the fibrous material enters depithing vessel 37, most of the parenchyma pith cells in the mass will fall onto sieve plate member 40. A series of baffles 38 are also contained in the depithing vessel 37.

From sieve plate member 40, a brush 39 sweeps the pith cells to small holes in the screen where they pass through a chute 41 onto a conveyor 42, which then deposits the pith cells into a storage bin 43, equipped with a discharge valve 44, to empty the system.

The pith cells discharged from storage bin 43 can then be used in the manufacture of pressed board, charcoal briquettes, pressed granules for activated carbon, and as refuse derived fuel (RDF) for boilers.

Depithing vessel 37 is also equipped with a "T-joint" chute 45 and a connecting tube 46 which supplies a filtering conveyor 47, similar in construction to filtering conveyor 14. Filtering conveyor 47 is positioned on top of a funnel-shaped tank 48, which is connected to a leveling cylinder 49. Thus, fine mesh fibers from the depithing vessel are blown through chute 45 where they contact an alkaline solution flowing from storage tank 79 through pipe 81 connected to dispensing pump 82, through line 83, U-joint 84, and pipe 85 which connects with T-joint chute 45. Storage tank 79 is also equipped with a drain valve 80.

The output of leveling cylinder 49 is connected to a T-joint pipe 50, with the remaining ends of the tee connected to pipes 51 and 52, respectively. Pipe 51 is connected to the middle section of a continuous cooking vessel 53, whereas pipe 52 is connected to the bottom of continuous cooking vessel 53.

Continuous cooking vessel 53 contains an endless conveyor belt 105, which is equipped with a series of plates 54, and revolves on rollers 55 through an endless channel in cooking vessel 53.

The conveyor belt 105 is powered by a heavy duty gear motor 56. Cooking vessel 53 is provided with a steam inlet pipe 57, and an outlet pipe 58.

The slurried mass entering cooker 53 from filtering conveyor 47 is heated by steam from line 57, which dissolves lignin and other soluble substances in the fiber.

The remaining fibers in continuous cooker vessel 53 undergo a bleaching treatment and are then passed by conveyor plate 54 through a series of pressure rollers 59, where they then pass into defibrator member 60, which is similar in construction to defibrator 10.

Defibrator 60 will beat the pulp vigorously to separate any residual foreign matter in the fiber, and is equipped with a neck sieve 61, which is connected to a valve 62, connected to a pipe 63 which connected to a storage tank 64. Storage tank 64 is equipped with a vent 65, a drain valve 66, and a pump 67 which recycles liquid through pipe 68 to defibrator 60.

The output of storage tank 64 is connected to a "T-joint" valve 69, connected to a pipe 70, leading into a screw mixing tank 71.

The partially bleached pulp slurry which has been separated from residual foreign matter in the defibrator 60 flows into overflow channel 87 onto conveyor sieve filter 88, while the bleach solution drains into storage tank 90.

The squeezed bleach pulp can then be fed directly into another continuous cooking vessel member (not shown) with fresh bleach solution from another storage tank (not shown). The operation of defibrator 60 can also be repeated in another unit.

The bleached solution on conveyor sieve filter 88 is drained into storage tank 90, while the bleached pulp is removed from conveyor sieve filter 88 through rollers 89 into chute 96 in communication with an air blower 94 which forces the bleached pulp into a kneading machine 97.

Kneading machine 97 combs the semi-dried pulp under tension vigorously to separate any remaining foreign matter, and also to strengthen and give the pulp a smooth, soft, glossy, strong and attractive texture.

The storage tank 90 is equipped with a valve 91 and a pump 92, connected to a pipe 93 which recycles onto conveyor filtering sieve 88.

The air blower 94 is connected to the chute member 96 by means of pipe 95, with the flow of air forcing the alpha-cellulose into the chute and then into the input of kneading machine 97.

The kneading machine 97 is equipped with a saw-tooth edge comb powered by a heavy duty motor 98 that revolves and combs the fiber in counter-rotation at different speeds under tension, thereby refining the fiber.

A chute 100 is connected from kneading machine 97 into a rotary disc refiner 101. The rotary disc refinery reduces the pulp to proper length and slightly frays the end and sides of the pulp so that it mats together properly on the papermaking machine.

The mixing screw tank 71 empties into a storage bin 72 through a conveyor or elevator device (not shown). The storage bin 72 is equipped with a discharging wheel to load mass from the storage bin 72 onto a conveyor (not shown) and empties into a furnace 73.

The furnace 73 will empty burned hot mass from the system directly onto a slaking tank 74, which is equipped with a heavy duty gear motor that stirs the tank contents.

A water tank 75 is connected by a pipe and drawn into slaking tank member 74. The output of the slaking tank 74 is connected by a pipe and drawn into a continous rotary filter 76.

The continuous rotary filter 76 is connected by a pipe 77 into storage tank 79. A conveyor or elevator 103 from continuous rotary filter member 76 is connected into the screw mixer 71.

Refining is an important factor which brings about fundamental changes in the pulp. It increases the degree of interfiber bonding in the paper sheet. Beating increases paper strength properties except for tear resistance, and decreases opacity, and lowers the bulk and dimensional stability of the paper.

After refining, dyestuffs, pigments and other sizing materials can be added. These ingredients are mixed the pulp thoroughly to form a specific pulp concentration with water for the papermaking operation.

Recovery of Alkali Reagent

Storage tank 26 contains free amino acids, or the black liquor, or both, from the soda or Kraft pulp solution. The solution usually contains organic solids and alkali. Most are sodium and potassium carbonates and free alkaline solution.

The black liquor is pumped and mixed with shredded refuse derived fuel (RDF) from the plantation 1 at screw mixing tank 71. The mixture is fed into a furnace 73. The burned refuse containing free carbon from the organic solids from furnace 73 is charged into a slaking and caustic vessel 74. The hot black ash is stirred with water from tank 75 or with a reagent solution from storage tank 79.

The resulting alkaline mixture is leached, pumped and filtered in a rotary disc filter 76. The residual calcium carbonate which is insoluble in water is returned into screw mixing tank 71. The calcium carbonate is recycled again and again to produce the alkaline reagent necessary to digest the fibers from the plantains. Any weak alkaline solution obtained in this manner is concentrated by adding an additional caustic soda salt to make up the required concentration. The chemical reaction for the recovery of the alkaline or alkali reagent is as follows:

The recovery of the chemicals can be designed to adapt either Kraft pulp or soda pulp, since both are similar. Both are akaline processes which are used for the purpose of dissolving or hydrolyzing any amount of lignin and other organic substances in wood or leaf fibers.

Recovery of Acid Reagent and By-Products

The acid solution collected in storage tank 26 or 90 is boiled by jet heaters to hydrolyze any starch in the filtrate from said storage tanks for fermentation. A solid residue from these tanks can be used for poultry feeds or for the production of fertilizers.

Recovery of Bleaching Solution

A dilute bleach solution is collected in storage tanks 64, 70 or 90. The solution is recycled for the recovery of chlorine gas by means of distillation. The chlorine gas is bubbled through the weak bleach solution from 90, or the make up bleach solution from tank 64. In order to obtain a variance of concentrations for the bleached solution, additional bleaching salts from tank 79 can be added to the weak solution at tank 64 to make up the desired concentration. The residue left from distillation is conveyed to screw mixer 71 to be burned in furnace 73.

Bleaching Cycle of The Plantain-Banana Pseudostems For Papermaking

The soda pulp from continuous cooking vessel or digester or bleaching vessel 53 is transfered into defibrator 10. Defibrator 60 also receives used bleach solution from the storage tank 90. This weak bleach solution is used to beat, rinse, and extract the soda pulp. The black liquor from this material is conveyed into storage tank 16. The partially chlorinated soda pulp is compressed and transported into vessel 53, which receives fresh bleach solution from the make-up bleaching tank 79.

The soda pulp is treated in bleaching vessel 53. The used bleach solution from this vessel is drained into storage tank 90 while the compressed bleached pulp is conveyed into defibrator 10, which receives used bleach solution from storage tank 90 for beating, rinsing the bleached pulp is transported into vessel 53 where fresh bleaching solution from tank 79, having a higher concentration is used.

The bleached pulp is squeezed, and the used solution conveyed into storage tank 90.

The bleached pulp from vessel 53 is transported to defibrator 10, where water or calcium hydroxide solution or hydrochloric acid solution is used in the beating, rinsing and extraction of the pulp. The used solution from the defibrator 10 is then conveyed to storage tank 90, while the bleached white pulp is transported into the kneading machine 97 and the rotary disc refiner 101. The refined white pulp 102 is conveyed to the papermaking operation 103.

Figure 1:
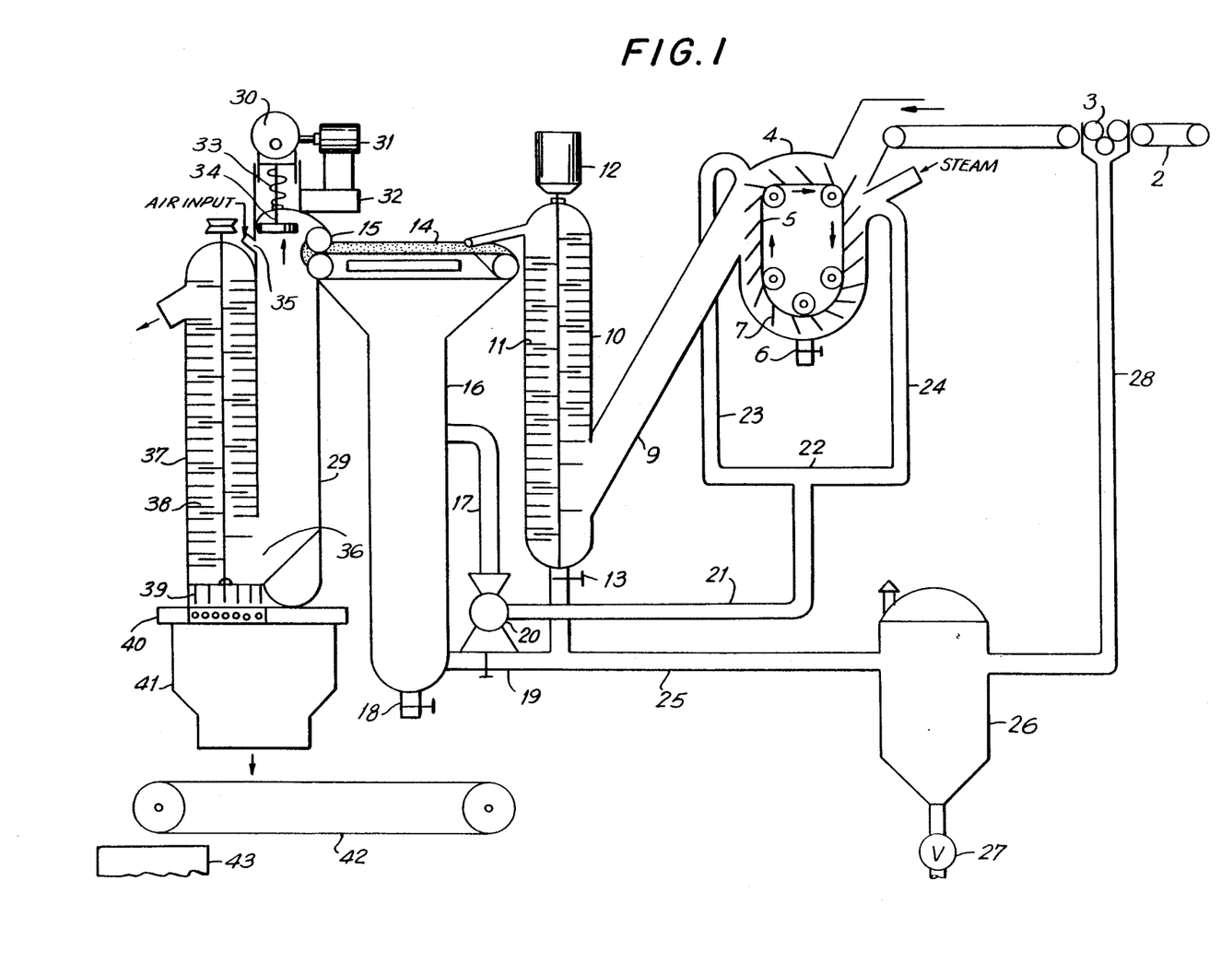
FIG. 1 is a schematic drawing of a continuous depithing device for pulping plantain pseudostems.
Figure 2:
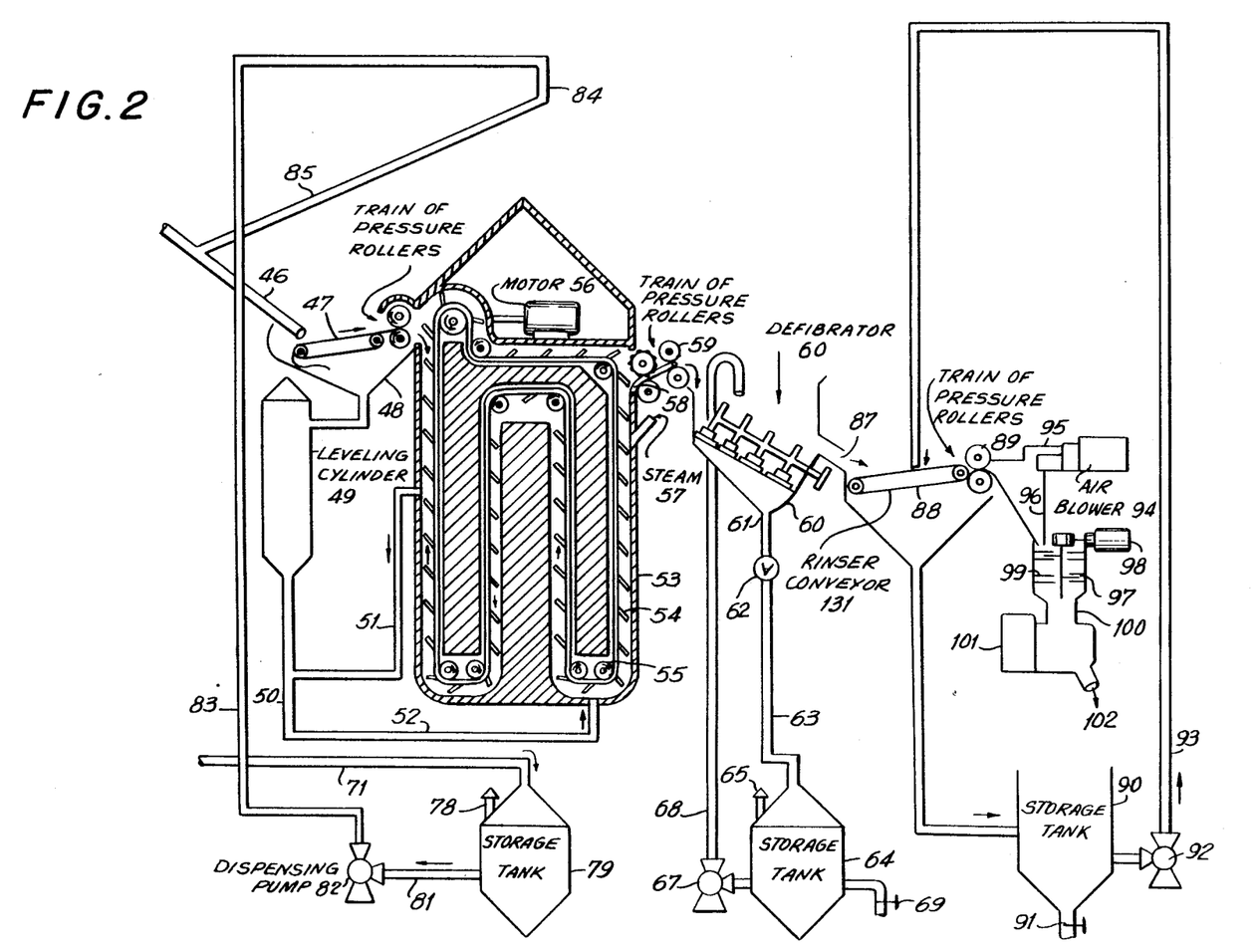
FIG. 2 is a schematic representation of a continuous digesting and bleaching vessel for pulping plantain.
Figure 3:
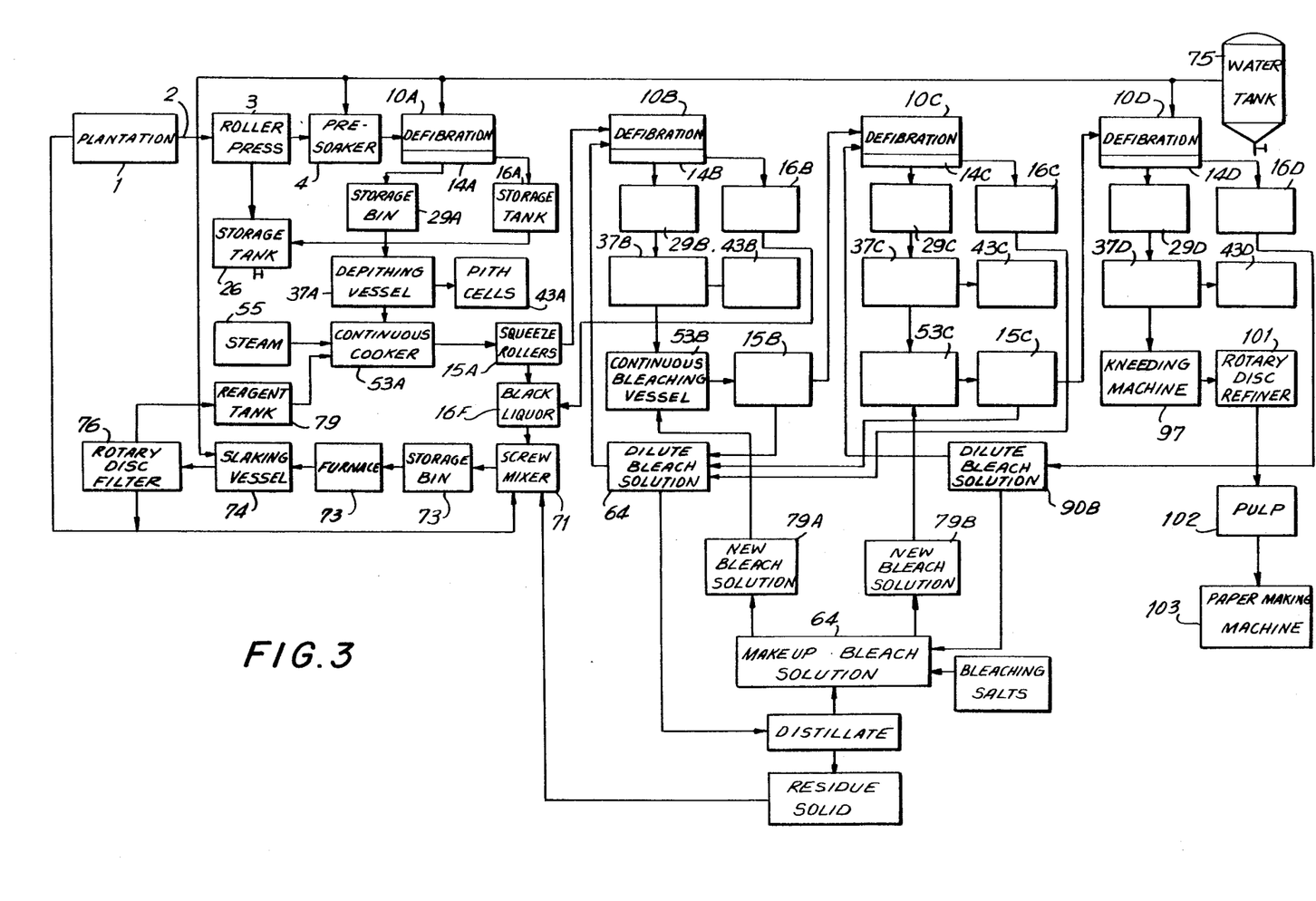
FIG. 3 is a block flow sheet for pulping the plantain pseudostems for papermaking.
Figure 4:
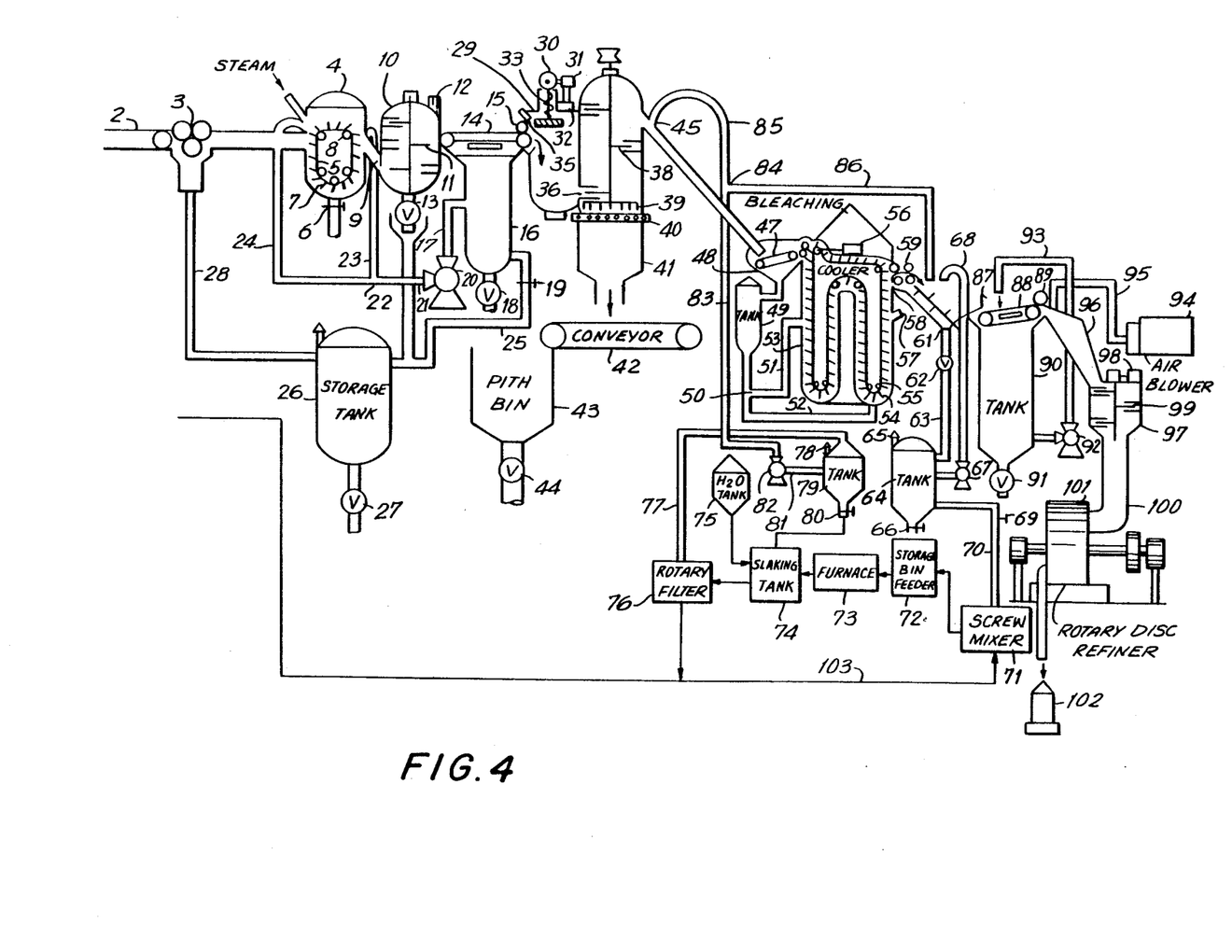
FIG. 4 is a diagrammatic flow sheet showing the overall pulping process.

A flow scheme of the depithing process of plantain-banana pseudostems for papermaking can be represented as follows:

and extracting the pulp.

The solution from tank 90 is composed of calcium hydroxide and bleached solution. The compressed solution from tank 10 is drained into storage tank 90, while A flow scheme for the bleaching process of the depithed plantain/banana psdudostems for papermaking is as follows:

10. Steam + Bleached Pulp + Bleaching vessel 53(D) + New bleaching solution to bleach  Dilute bleached solution + Bleached Pulp to 90(B) or to 90(C)

11. Bleached Pulp + Defibrator 10(D) + Fresh water or dilute calcium hydroxide or acid solution to rinse from 90(B) or 90(C)  Dilute rinsing solution to 90(B) or 90(C) + Completely bleached white pulp to kneading machine 97 and rotary disc refiner 101. From 101 to papermaking machine.

What is claimed is:

1. A method for obtaining useful products, including pulp for papermaking, from green plantain pseudostem, comprising the steps of:

compressing the green plantain pseudostem to obtain a liquid as a first useful product which contains amino acids, starch, and organic salts useful as plant food and fertilizer and partially defluidized plantain pseudostem;

beating the partially defluidized plantain pseudostem with water to convert the same into a fine slurry;

squeezing the fine slurry to obtain additional first useful liquid product and fibrous material formed of plantain pseudostem;

subjecting the fibrous plantain pseudostem material to a depithing treatment to obtain depithed fine mesh fibers and parenchyma pith cells separated therefrom, the pith cells constituting a second useful product;

mixing the depithed fine mesh fibers with an alkaline solution to obtain a slurry mass of fine mesh fibers and subjecting the slurry mass to a steam cooking treatment to dissolve lignin and other soluble substances contained therein to obtain a cooked mass, separating the fine mesh fibers from the liquid of the cooked mass to obtain a black liquor as a third useful product;

beating the fine mesh fibers with a bleach solution to obtain a fine mesh partially bleached pulp slurry;

squeezing the fine mesh slurry to separate additional black liquor from at least partially bleached fine mesh fibers of alpha cellulose;

depithing the alpha cellulose; and kneading the bleached alpha cellulose to strengthen and give the pulp a smooth, soft texture to thereby obtain substantially pure alpha cellulose pulp for papermaking as a fourth useful product.

2. The method of claim 1 further including the following steps to recover alkali reagents:

mixing black liquor constituting the third useful product and calcium carbonate with shredded refuse derived fuel;

feeding the mixture into a furnace;

charging the burned refuse containing free carbon into a slaking and caustic vessel and forming an alkaline mixture by mixing the same with a reagent; and leaching and filtering the alkaline mixture to obtain an alkaline reagent solution and residual calcium carbonate.

3. The combination of claim 1 further including the step of boiling the liquid first useful product to hydrolize the starch to obtain a solid residue in order to recover acid reagents.

4. The combination of claim 1 further including the following steps to recover the bleach solution:

collecting the bleach solution after obtaining the fine mesh partially bleached pulp slurry;

distilling the solution to recover chlorine gas;

bubbling the chlorine gas through the bleach solution to obtain a residue; and burning the residue.

* * * * *